United States Patent [19]

Dambach et al.

[11] Patent Number: 4,812,003

[45] Date of Patent: Mar. 14, 1989

[54] OPTIC SENSING ASSEMBLY

[75] Inventors: Philip J. Dambach, Naperville, Ill.; Ray Brown, Los Gatos, Calif.

[73] Assignee: Molex Incorporated, Lisle, Ill.

[21] Appl. No.: 119,012

[22] Filed: Nov. 10, 1987

[51] Int. Cl.$^4$ .............................................. G02B 6/32
[52] U.S. Cl. .............................. 350/96.18; 350/96.15; 350/96.29; 250/227
[58] Field of Search ............... 350/96.15, 96.18, 96.29; 250/227

[56] References Cited

U.S. PATENT DOCUMENTS

| | | | |
|---|---|---|---|
| 4,329,017 | 5/1982 | Kapany et al. | 350/96.15 |
| 4,358,960 | 11/1982 | Porter | 250/227 |
| 4,692,611 | 9/1987 | Hoogenboom | 250/227 |

FOREIGN PATENT DOCUMENTS

| | | | |
|---|---|---|---|
| 0102506 | 6/1985 | Japan | 250/227 |
| 0259139 | 11/1986 | Japan | 250/227 |
| 1216752 | 3/1986 | U.S.S.R. | 350/96.15 |

Primary Examiner—William L. Sikes
Assistant Examiner—Xuan Thi Vo
Attorney, Agent, or Firm—John W. Cornell; Louis A. Hecht

[57] ABSTRACT

An optic sensing assembly for detecting reflection at a target area includes a cable holding element formed as an integral, one-piece body having sockets for directly receiving nonterminated ends of a light supply fiber optic cable and a light receiving fiber optic cable. Stop portions in the sockets accurately position the fiber optic cable ends. A housing has a cavity slideably receiving the holding element and latch structures on the holding element and housing engage with one another to secure the holding element with stop portions positioned at a precise location relative to housing. A strain relief structure is effective upon engagement of the latch structures for holding fiber optic cable ends within the sockets. An aperture in the housing communicates with the cavity for permitting light transmission between the cable ends and the target area. A lens structure formed integrally in the holding element directs or focuses light along paths from the cable ends to the target area.

23 Claims, 3 Drawing Sheets

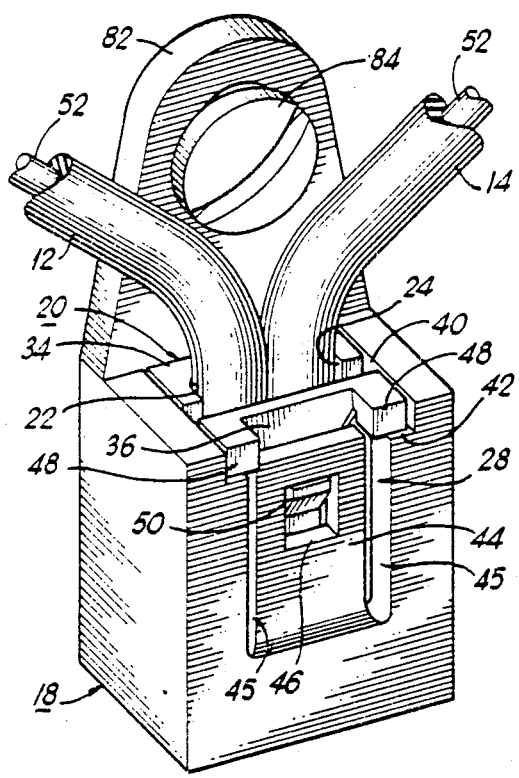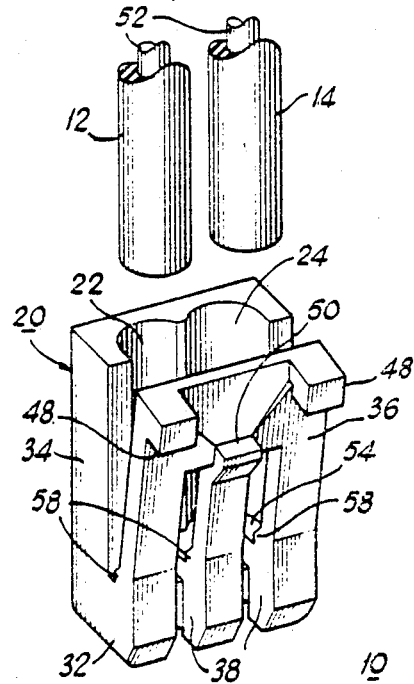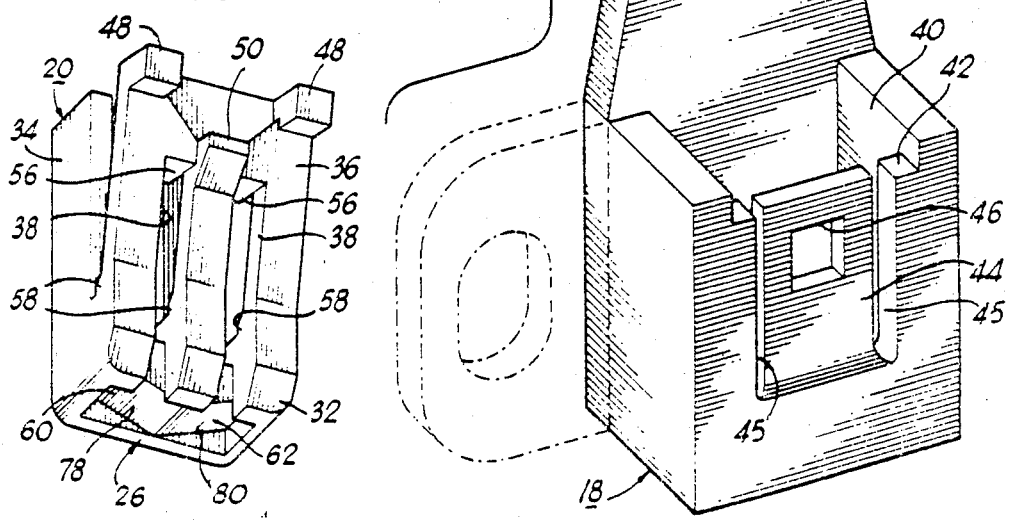

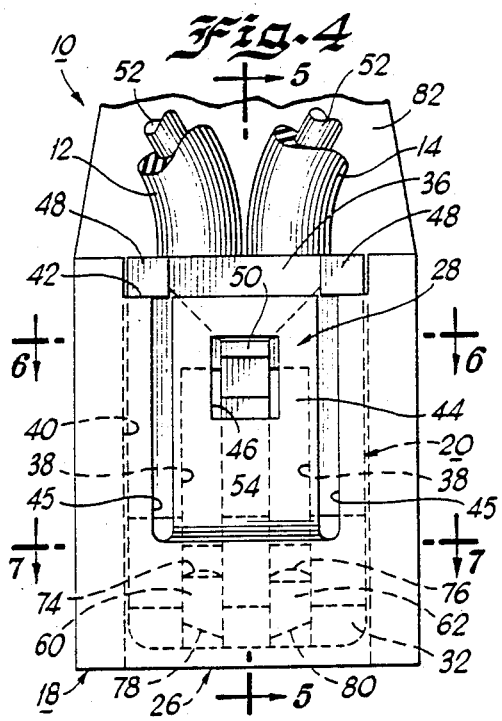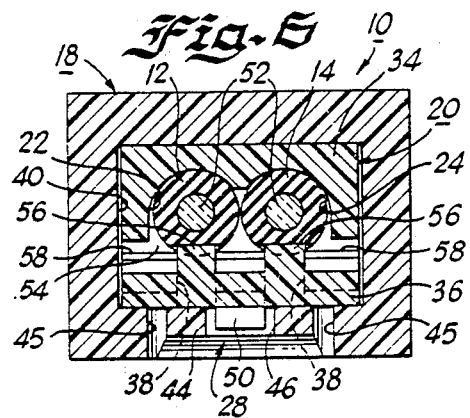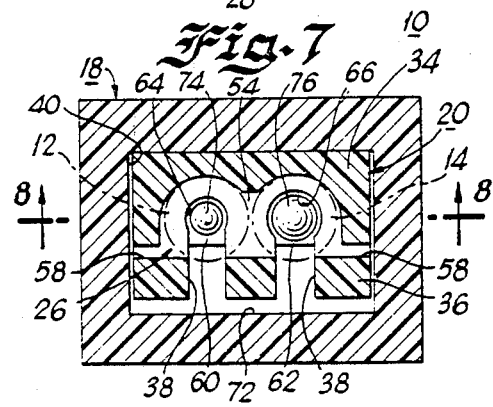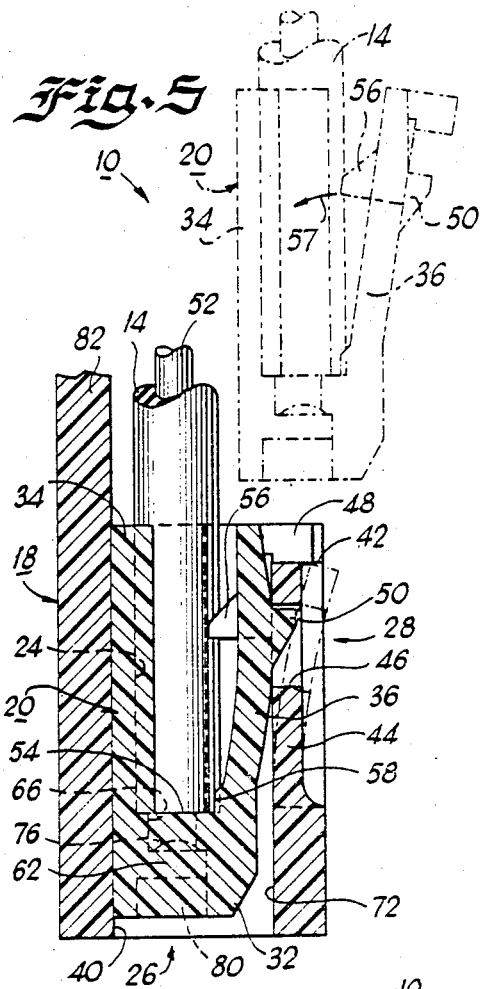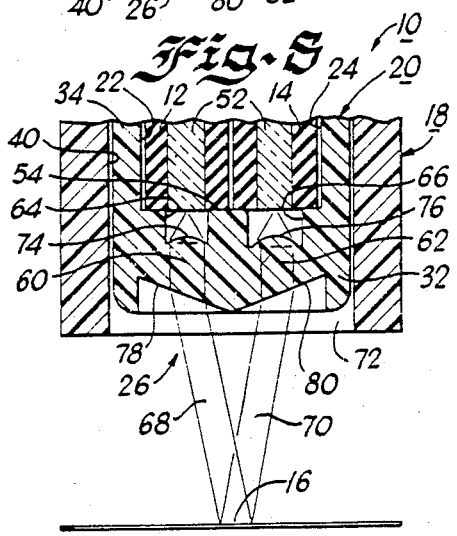

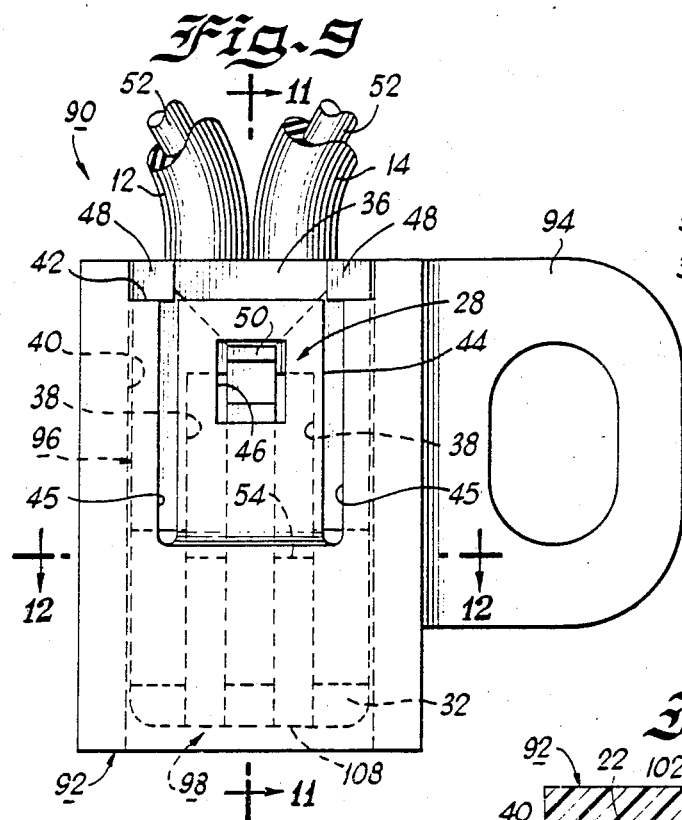
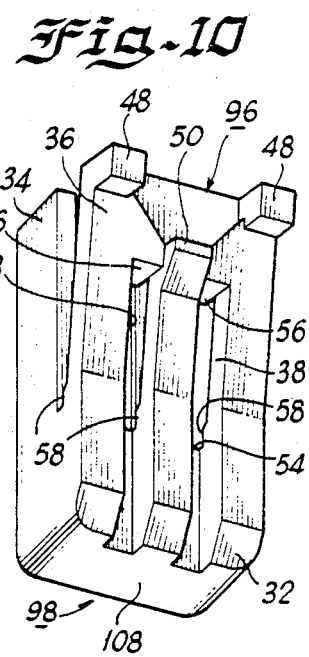
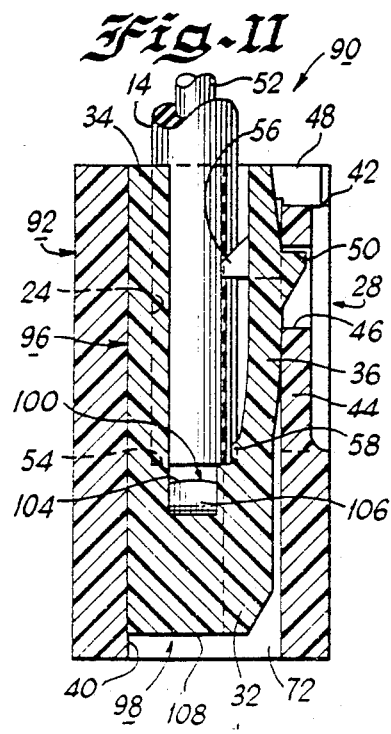
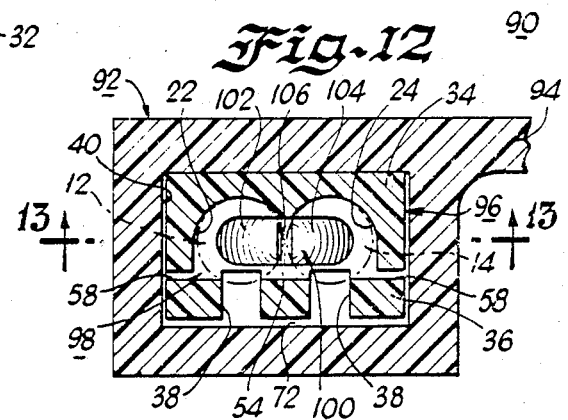
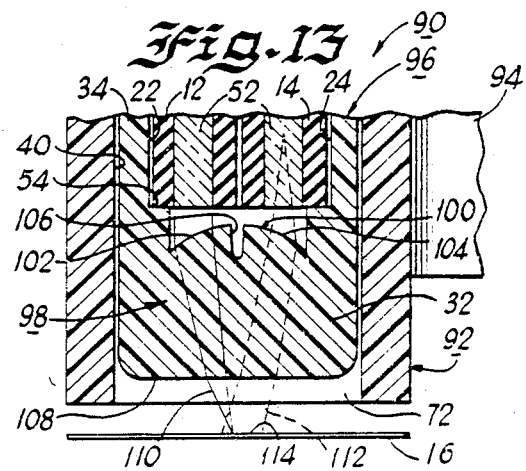

OPTIC SENSING ASSEMBLY

The present invention relates to optical sensing systems and more particularly to optic sensing assemblies for supporting the ends of a pair of fiber optic cables in proximity to a target area where light reflection is to be detected.

BACKGROUND OF THE INVENTION

Fiber optic technology is increasingly used in place of conventional electrical circuits and components for a variety of different functions. Advantages can include simplicity, reliability and, with decreasing cost of fiber optic components, decreased expense.

There are many instances when it is necessary or desirable to detect the presence or absence or the position of an object at a given location. One example is a printer used for reproducing material such as text or graphic output from a computer or other source. Typically a printer includes a mechanism for feeding paper in sheet or continuous form to a location where characters or other matter is printed onto the paper. In connection with the control of the printer or computer or the like, it is desired to determine whether or not paper is present at a location in the printer or associated paper feed mechanism. For this purpose, a sensor is used along the paper feed path to determine whether or not paper is present.

In the past it has been conventional to mount an electrical switch near the paper feed path. The typical switch used for this purpose includes a lever or arm in the paper path that is moved by paper in the path to operate the switch. Electrical conductors extend from the switch to remote circuitry, and the switch includes moving mechanical parts causing expense, complexity and the eventual need for replacement. Of course there are many other instances in which electrical switches and similar electrical circuit components have been used to detect the presence or position of an object at a given location, and all such instances are potentially subject to similar problems and disadvantages.

In order to overcome disadvantages incident to the use of electrical sensing devices, it would be desirable to use fiber optic techniques in place of electrical components. However, other problems arise in adapting fiber optic technology to an optical sensing system. The difficulties include connecting the ends of fiber optic capables with a simple and inexpensive assembly while achieving optimum use of transmitted light. Since the goal is to provide a reliable indication of the presence of an object, such as paper along a printer paper feed path, an accurate optical system must be provided to assure that the maximum amount of light is properly transmitted to and from a target area. This should be accomplished without complex and expensive optical components, without the necessity for critical manufacturing tolerances and without painstaking assembly or fabrication procedures.

SUMMARY OF THE INVENTION

It is a primary object of the present invention to provide improved optic sensing assemblies for detecting the presence or absence of light reflection at a target area. Other objects are to provide optic sensing assemblies that are simple and inexpensive to make and to assemble; to provide assemblies including an integral lens system maximizing the use of available light; to provide assemblies that are easily connected to simple, nonterminated ends of fiber optic cables without special preparation of the cable ends and without the necessity for special care or highly skilled labor; to maximize the coupling of light with an assembly that can be economically manufactured; to provide assemblies in which fiber optic cable ends are mechanically secured and precisely optically located in a simple and automatic manner; and to provide improvements in optic sensing assemblies overcoming disadvantages of prior electrical sensing systems and of known optical systems.

In brief, the present invention provides an improved optic sensing assembly for use in an optical sensing system for sensing light reflection at a target area. The system includes a fiber optic light supply cable and a fiber optic light receiving cable with the ends of the cables disposed in proximity to the target area. The optic sensing assembly of this invention includes a housing having mounting means for supporting the housing in a predetermined orientation with respect to the target area and a cable holding element for holding the fiber optic cable ends. The housing and cable holding element include cooperating latch means for securing the cable holding element to the housing, and the cable holding element includes means for socketing the cable ends. Lens means are disposed in light transmitting relation with said socketing means for directing or focusing light from the light supply cable end upon the target area and for directing or focusing light from the target area upon the light receiving cable end.

BRIEF DESCRIPTION OF THE DRAWINGS

The present invention together with the above and other objects and advantages may best appear from the following detailed description of the embodiment of the invention shown in the accompanying drawings, wherein:

FIG. 1 is a perspective view of an optic sensing assembly constructed in accordance with the present invention;

FIG. 2 is an exploded perspective view of the assembly of FIG. 1 illustrating the components prior to assembly, and illustrating an alternate mounting structure in broken lines;

FIG. 3 is a perspective view of the cable holding element of the assembly of FIG. 1;

FIG. 4 is a fragmentary front elevational view of the assembly of FIG. 1;

FIG. 5 is a sectional view taken along the line 5—5 of FIG. 4 and illustrating in broken lines the cable holding element prior to assembly;

FIG. 6 is a sectional view taken along the line 6—6 of FIG. 4;

FIG. 7 is a sectional view taken along the line 7—7 of FIG. 4;

FIG. 8 is a fragmentary sectional view taken along the line 8—8 of FIG. 7, illustrating the light paths used to sense reflection at a target area;

FIG. 9 is a front elevational view of an optic sensing assembly comprising an alternate embodiment of the present invention;

FIG. 10 is a perspective view of the cable holding element of the optic sensing assembly of FIG. 9;

FIG. 11 is a cross sectional view taken along the line 11—11 of FIG. 9;

FIG. 12 is a cross sectional view taken along the line 12—12 of FIG. 9; and

FIG. 13 is a cross sectional view taken along the line 13—13 of FIG. 12.

DETAILED DESCRIPTION OF THE PREFERRED EMBODIMENT

With reference to FIGS. 1-8 of the accompanying drawings, there is illustrated an optic sensing assembly designated as a whole by the reference character 10 and constructed in accordance with the principles of the present invention. Assembly 10 is secured to the ends of a light supply fiber optic cable 12 and a light receiving fiber optic cable 14 and is incorporated in an optical sensing system used for detecting the presence or absence of light reflection at a target area 16 (FIG. 8).

In general, the optic sensing assembly 10 of the present invention includes a housing generally designated as 18 within which is releaseably mounted a cable holding element 20. The cable holding element 20 includes sockets 22 and 24 for the ends of cables 12 and 14 as well as a lens structure 26 for transmitting light between the cable ends and the target area 16. A latch system 28 holds the cable holding element 20 in the housing 18, provides a stress relief function for the cables 12 and 14 and accurately positions the cables in sockets 22 and 24 for optimum use of light in detecting the presence of light reflection at the target area 16.

The assembly 10 can be used in an optical sensing system for detecting the presence of paper along the paper feed path of a printer used with a computer or other source of text or graphic matter to be printed. In this case the target area 16 is an area along the paper feed path where paper may be present as illustrated in FIG. 8 to reflect light or, alternatively, paper may not be present in which case light is not reflected. The principles of the present invention are equally applicable to many other systems in which the presence or absence or position of an object is detected, either by reflection from the object or by reflection from a target area blocked by the object. In any such system, the light supply cable 12 is provided with light from any conventional source of visible or infra-red or other light and the light receiving cable 14 extends to any conventional light responsive device providing an output or control signal in accordance with the presence or absence of reflected light transmitted to the cable 14. The details of the sensing system not shown in the drawings are unnecessary to an understanding of the present invention.

Cable holding element 20 is an integral, onepiece body of material having the optical qualities needed for the lens structure 26 and having the strength and flexibility needed for the sockets 22 and 24 and for the latch system 28, Preferably, cable holding element 20 is a uniform, homogeneous, molded mass of clear, transparent, optical grade acrylic plastic or similar material.

The cable holding element 20 is generally of a rectangular shape, and includes a bottom wall segment 32 in which the lens structure 26 is defined. Extending up from wall segment 32 is a fixed wall structure 34 having a scalloped, partly circular internal shape defining the cable sockets 22 and 24, each open along one side. A flexible and resilient latch tongue 36 also extends up from wall segment 32 opposite the wall structure 34. Tongue 36 overlies the open sides of the cable sockets 22 and 24. Flexibility of tongue 36 results from the nature of the material of element 20, the dimensions of the tongue, and from recesses 38 also serving to accommodate parts of the mold used to form the element 20.

Housing 18 is also generally rectangular in shape, and is preferably molded integrally as one piece of a suitable plastic material such as opaque, glass filled polyester or the like. A generally rectangular cavity or opening 40 extends throughout the length of housing 18 and is sized slideably to receive the cable holding element 20. A recess or notch 42 is formed in the front of housing 18, and a wall portion 44 extending down from this recess includes a latching opening or slot 46 aligned with the tongue 36 when the cable holding element 20 is inserted into cavity 40. Wall portion 44 is flanked by slots 45 and is of a reduced thickness so that it is able to flex outwardly when cable holding element 20 is inserted into cavity 40.

When cable holding element 20 is inserted into the cavity 40 of housing 18, it is held precisely in position by the latch system including tongue 36 and latch slot 46. A pair of stop fingers 48 extend outwardly from the end of tongue 36 to engage the bottom of notch 42 to limit insertion and permit the cable holding element 20 to fit flush in housing 18. A latch protuberance 50 also extends outwardly from tongue 36. As element 20 enters cavity 40, the tongue 36 is resiliently flexed inward and the wall portion 44 flexes outward as shown in broken lines in FIG. 5 until protuberance 50 snaps into latching engagement with latch slot 46 (FIG. 5) to retain the element 20 in assembly with housing 18. If desired for removal of paper particles or the like from lens structure 26 or for other reasons, the element 20 may be removed by moving wall section 44 forward until the protuberance 50 is clear of the slot 46 and then lifting the element 20.

Fiber optic cables 12 and 14 are similar to one another and are standard stepped index, multimode cables having, for example, cores 52 with diameters of one milimeter and outside diameters of 2.2 millimeters, although cables of other types and configurations could be used if desired. The ends of the cables 12 and 14 with a smooth optical finish are received directly into sockets 22 and 24 in a nonterminated condition, i.e. without the necessity for applying terminal elements or otherwise specially preparing the cable ends.

Sockets 22 and 24 have a size and shape to permit and unobstructed sliding insertion of the cables 12 and 14 in the axial direction into the cable holding element 20 before assembling the element 20 to the housing 18. The sockets are side-by-side and parallel to each other and each socket ends at a stop surface 54 defined by the top of the bottom wall segment 32 as best seen in FIGS. 5 and 8. When cables 12 and 14 are inserted, the ends of the cores 52 are accurately located above the lens structure 26 by engagement of the cable ends with the stop surface 54.

The inner side of tongue 36 includes a pair of spaced apart strain relief projections 56, one aligned with each socket 22 and 24 as illustrated in FIGS. 5 and 6. Projections 56 initially have a slight interference fit with the inserted cables 12 and 14, as can be seen in broken lines in FIG. 5. This interference fit tends to retain the cables in place in the sockets 22 and 24 until the cable holding element 20 is inserted into housing 18.

After insertion of the nonterminated cable ends into the sockets 22 and 24, the cable holding element 20 is seated into the housing 18 and the tongue 36 flexes inwardly as described above. Firm mechanical holding and strain relief of cables 12 and 14 automatically results. As tongue 36 flexes, the projections 56 engage the sheathes of cables 12 and 14 and apply a force in the direction of the arrow 57 (FIG. 5) to urge the cable ends against the stop surface 54. In the assembled position shown in full lines in FIG. 5, projections 56 firmly grip the cables 12 and 14 and provide a strain relief function assuring that the cables are not moved from their precisely determined positions after assembly. The cable ends are prevented from flexing forward during flexing of tongue 36 by engagement with thick base portions 58 of the tongue. Portions 58 also causes flexing of the tongue 36 to occur in the region spaced above the stop surface 54.

Lens structure 26 appears best in FIGS. 7 and 8 and is formed as an integral part of the one piece cable holding element 20 to assure that the optical components of the assembly 10 achieve optimum use of the light transmitted from the light supply cable 12. The lens structure 26 includes two lens systems 60 and 62 aligned respectively with sockets 22 and 24 and communicating with the cable ends through light path openings 64 and 66. A light path 68 from the end of cable 12 to target area 16 and a light path 70 from target area 16 to the end of cable 14 are shown in FIG. 8. These illustrations are approximations, and the light paths are not so sharply defined in actuality. Path 68 extends through opening 64 and lens system 60 while path 70 extends through lens system 62 and opening 66. The lower end of cavity 40 in housing 18 provides an aperture 72 for light to travel between target area 16 and lens structure 26.

With respect to the embodiment of FIGS. 1-8, the ends of cable cores 52 are assumed to function as sources or receivers of diverging or converging non collimated light with effective light apertures of about thirty degrees. Lens system 60 includes a lens portion 74 for transforming the diverging light beam from cable 12 into a generally collimated light beam. Lens system 62 includes a lens portion 76 for transforming a generally collimated light beam reflected from target area 16 into a converging beam directed toward the center of cable 14. The ends of cables 12 and 14 are coplanar at stop surface 54 and lens portions 74 and 76 are spherical segments with generally similar radii of curvature. Portion 74 is smaller in area or diameter than portion 76 in order to transmit only the more intense central part of the light beam projected from cable 12. Portion 76 is larger in order to direct all light reflected from target area 16 onto the end of cable 14.

Lens systems 60 and 62 include diffraction lens portions 78 and 80 symmetrical about the centerlines of the two lens systems. Portions 78 and 80 comprise flat planar surfaces each arranged at an angle related to the angle of diffraction of the air-acrylic interface and the distance to the target area 16 in order that the collimated beams of light paths 68 and 70 overlap fully at the target area for maximum light reflection. For example, in the embodiment illustrated in FIGS. 1-8, the distance from the bottom of housing 18 to target area 16 is about 0.2 inch and the lens portions 78 and 80 are at an angle of about 68 degrees, 15 arc minutes to horizontal. To prevent scratching or other damage to the lens structure 26 and the accumulation of debris such as paper particles at lens portions 78 and 80, the cable holding element 20 is inset above the bottom of the housing as appears in FIGS. 5 and 8. Lens portions 74 and 76 each have a relatively small radius of curvature of about 0.03 inch in order to direct light toward or from an assumed point source or target at the closely adjacent end of the core 52 of cable 12 or 14.

A mounting tab 82 extends upward from the housing 18 as seen in FIG. 1. A fastener 84 is used to secure the assembly 10 in a fixed position at the desired distance from the target area 16. An alternate location for a mounting tab is shown in broken lines in FIG. 2, and this variation may be preferred if the fastener 84 interferes with insertion and removal of cable holding element 20 or depending upon space requirements.

In use, the ends of cables 12 and 14 are inserted against stop surface 54 in sockets 22 and 24. Then the cable holding element 20 is seated into cavity 40 of housing 18, causing the latch system 28 to hold the element 20 in place and to hold the cables 12 and 14 in place with a strain relief effect. Light supplied from cable 12 travels along path 68 through lens system 60 onto target area 16. If light reflection occurs, light is reflected from the target area 16 along path 70 through lens system 62 to cable 14, and the presence or absence of reflected light can be used to provide a control function. Target area 16 may be a reflective object, such as paper in the feed path of a printer. Alternatively, target area 16 may be a reflective surface and an object to be detected may move between the target area 16 and the assembly 10. Assembly 10 can also serve as a proximity detector by detecting the presence of a reflective object at the distance from the assembly 10 where the light paths 68 and 70 overlap one another.

Referring now to FIGS. 9-13, there is illustrated an optic sensing assembly 90 constituting an alternative embodiment of the present invention. In many respects, the assembly 90 of FIGS. 9-13 is similar to the assembly 10 shown in FIGS. 1-8 and described in detail above. In the following description, the same reference numerals are used for similar elements of the two assemblies, and the description is directed primarily to the differences.

As with the assembly 10, the optic assembly 90 is secured to the ends of fiber optic cables 12 and 14 and is part of an optical sensing system detecting the presence or absence of light at target area 16. Assembly 90 includes a housing 92 similar to the housing 18 described above, but having a laterally extending mounting tab 94 for securing the housing 92 a predetermined distance from the target 16. Cable holding element 96 is similar in some respects to the element 20 described above, but includes a lens structure 98 providing additional advantages to supplement the advantages of the lens structure 26 described above.

In some of the environments in which optical sensing assemblies may be employed, dirt or dust may be present and may interrupt or degrade the optical path and decrease the sensitivity of the optical sensor. Lens structure 98 is shaped to eliminate recesses in the optical path where dirt or dust might accumulate and be trapped. In addition, lens structure 98 is designed to employ point focused light paths rather than collimated light paths with improved optical coupling efficiency. Another result of this design is that the lens structure 98 is less subject to difficulties caused by manufacturing variations, and thus is less expensive to manufacture. Lens structure 98 provides a symmetrical optical system. Fiber optic cables 12 and 14 may be mounted in either of the two possible positions in the cable holding element 96, and either cable may serve as the light supply cable. Thus the expense of assembly and installation of the optical sensing assembly 90 is reduced.

Lens structure 98 includes a focusing lens 100 in the form of a spherical segment having a relatively large radius of curvature. Lens 100 is symmetrical with respect to the cores 52 of cables 12 and 14 because its radius of curvature originates at a point coinciding with the center line between cables 12 and 14. In the illustrated embodiment of the invention the radius of curvature of lens 100 is about 0.10 inch. This large radius simplified manufacture of the assembly 90 because small variations in the shape or size of lens 100 do not have a large effect on the ability of the lens to focus or direct light in the desired manner as compared with lenses such as those of the assembly 10 having a small radius of curvature.

Lens 100 is subdivided into two similar segments 102 nd 104 by a groove or recess 106. Segments 102 and 104 are aligned respectively with the cores 52 of fiber optic cables 12 and 14 in order to receive or transmit light from or toward the cables. The groove 106 provides isolation of light in each side of the lens 100 from the other side. Thus cross coupling or cross talk of transmitted and received light is prevented.

Lens structure 98 includes a lower refraction surface 108 that is flat and planar in configuration. Since no indentations or recesses are present in this exposed region, build up of dirt or other particles is avoided and the ability of the optical sensing assembly to function without the necessity for cleaning is improved.

The light transmitting and controlling components of the lens structure 98 including the lens 100, the groove 106 and the surface 108 are all symmetrical with respect to a plane separating the cores 52 of cables 12 and 14. Thus either cable may serve as the light supply cable and the other as the receiving cable without affecting the operation of the sensing assembly 90.

Fiber optic cables of appreciable length may eliminate or attenuate light having wider angle characteristics and transmit light that is tightly collimated. Thus, in the embodiment of the invention illustrated in FIGS. 9-13, the cable cores 52 are assumed to emit or receive collimated rather than diverging or converging light. In FIG. 13 two light paths 110 and 112 are illustrated. If cable 12 is used to supply collimated light, light transmitted along path 110 is focused by lens segment 102 toward a point or small area at the target 16. Refraction occurs at the lower surface 108. Light path 112 intersects the target 16 at an area or region 114 within which path 110 terminates. Light reflected from any point or area in this region travels along or within the path 112 through the lower surface 108 and lens segment 104 toward the cable 14. Light enters the core 52 of cable 14 at a small angle relative to the cable axis, consistent with the requirements of the optical fiber. If cable 14 is used as the light source, the operation is the reverse and paths 110 and 112 each assume the alternate shape and function.

The lens portions 74 and 76 of the optic sensing assembly 10 and lens segments 102 and 104 of the optic sensing assembly 90 are spherical segments. If desired, different curved shapes, such as an aspherical shape, could be used to accomplish more precise light direction and control.

We claim:

1. An optic sensing assembly including housing means for supporting a pair of fiber optic cable ends and an integral, one-piece molded lens structure defining light transmission and light receiving paths extending from said cables to a target area, said lens structure comprising:
   a lens body having a first surface region spaced from and facing said cable ends and a second surface region spaced from said first surface region and spaced from and facing said target area;
   a pair of curved surface lenses formed on said first surface region in alignment with the cable ends; and
   said second surface region defining a pair of diffraction surfaces for aiming said light paths at a zone of coincidence at said target area.

2. An optic sensing assembly as claimed in claim 1, said curved surface lenses being spherical segments.

3. An optic sensing assembly as claimed in claim 2, said spherical segment lenses having the same radius of curvature.

4. A optic sensing assembly as claimed in claim 3, said spherical segment lenses being segments of different spheres.

5. An optic sensing assembly as claimed in claim 3, said spherical segment lenses being segments of the same sphere.

6. An optic sensing assembly as claimed in claim 1, said diffraction surfaces being coplanar parts of a flat planar surface.

7. An optic sensing assembly as claimed in claim 1, said diffraction surfaces being disposed in different angularly related planes.

8. An optic sensing assembly as claimed in claim 1, said curved surface lenses and said diffraction surfaces being symmetrical about a plane lying between said spherical segment lenses and said diffraction surfaces.

9. An optic sensing assembly as claimed in claim 1, further compirsing means defining a recess in said lens structure defined in said first surface region between said curved surface lenses for isolating said light paths from one another.

10. For use in an optical sensing system for sensing light reflection at a target area, the system including a fiber optic light supply cable and a fiber optic light receiving cable, each cable having an end disposed in proximity to the target area, an improved optic sensing assembly comprising in combination:
   a housing including a front end with an opening, a rear end with an opening, a cavity extending between said openings and mounting means for supporting the housing with its front end in a predetermined orientation with respect to a target area;
   a unitary cable holding element including a front end and means for socketing the supply and receiving cable ends and lens means disposed between the front end of said holding element and said socketing means in light transmitting relation with said socketing means for directing light from the light supply cable upon the target area and for directing light from the target area upon the light receiving cable;
   said light supply and light receiving cable ends retained in said cable holding element socket means adjacent the lens means; and
   said cable holding element received in the housing cavity and retained therein so that the front end of said holding element is positioned adjacent the opening in the front end of the housing.

11. An optical sensing system as in claim 10, wherein said socketing means includes first and second sockets formed in said cable holding element sized directly to receive nonterminated ends of the light supply cable and the light receiving cable respectively.

12. An optical sensing system as in claim 11, wherein said lens means includes first and second lens systems aligned respectively with said first and second sockets, each lens system including a curved lens portion for transforming transmitted light between a generally collimated light path and a convergent light path extending from the curved lens portion to the respective socket.

13. An optical sensing system as in claim 12, wherein the curved lens portions of said first and second lens systems have generally the same radius of curvature and the curved lens portion of the first lens system has a smaller area than the curved lens portion of the second lens system.

14. An optical sensing system as in claim 12, wherein each said lens system also includes a refraction portion directing generally collimated light from the lens system toward the target area.

15. An optical sensing system as in claim 12, wherein the curved lens portions of each lens system are spherical segments of the same sphere, said lens means includes a recess separating said segments.

16. An optical sensing system as in claim 12, wherein said refraction portions are coplanar.

17. An optical sensing system as in claim 12, wherein said refraction portions are disposed in different angularly related planes.

18. An optic sensing assembly comprising in combination:
a housing including a front end with an opening, a rear end with an opening, and a cavity extending between said openings:
a unitary cable holding element slidably receivable in said housing cavity including a front end and first and second fiber optic cable sockets defined therein, each of said sockets including stop means for positioning an end of an inserted fiber optic cable within the socket at a predetermined location relative to the front end of said holding element, and a lens structure defined intermediate the front end of the holding element and each of said stop means for directing light travelling from said first socket and travelling toward said second socket, said cable holding element received in said housing cavity such that the front end of the holding element is positioned at a predetermined location relative to the opening in the front end of the housing;
means for securing the holding element in position in said housing;
means for holding the ends of inserted fiber optic cables against said stop means in each socket; and
mounting means for supporting the housing with its front end in a predetermined orientation with respect to a target area.

19. An optic sensing assembly as in claim 18, wherein said means for securing the holding element in position in said housing includes a resilient latch arm having a latch projection defined on said cable holding element, said housing including a locking recess defined therein communicating with the housing cavity whereby upon inserting the cable holder element into said housing to said predetermined location, said latch projection is received in the locking recess and withdrawal of said cable holding element from said predetermined location is prevented.

20. An optic sensing assembly as in claim 19, wherein said resilient latch arm extends adjacent and in parallel spaced relation to said first and second sockets and said latch projection extends from a side of said latch arm opposite said sockets.

21. An optic sensing assembly as in claim 20, wherein said means for holding the ends of inserted fiber optic cables against said stop means in each socket includes strain relief projection means disposed on said latch arm on a side facing said sockets, said strain relief projection means grippingly engaging an inserted fiber end in each socket upon deflection of said latch arm toward said sockets to permit insertion of the cable holding element into said housing cavity.

22. An optic sensing assembly as in claim 18, wherein said stop portions are generally coplanar.

23. An optic sensing assembly as in claim 18, wherein said lens structure includes first and second lens systems each disposed between one said socket and said front end of the cable holding element.

* * * * *